United States Patent
Xu et al.

(10) Patent No.: US 10,650,192 B2
(45) Date of Patent: May 12, 2020

(54) METHOD AND DEVICE FOR RECOGNIZING DOMAIN NAMED ENTITY

(71) Applicant: BEIJING GRIDSUM TECHNOLOGY CO., LTD., Beijing (CN)

(72) Inventors: Wenbin Xu, Beijing (CN); Xin He, Beijing (CN)

(73) Assignee: Beijing Gridsum Technology Co., Ltd., Beijing (CN)

( * ) Notice: Subject to any disclaimer, the term of this patent is extended or adjusted under 35 U.S.C. 154(b) by 108 days.

(21) Appl. No.: 16/060,952

(22) PCT Filed: Dec. 2, 2016

(86) PCT No.: PCT/CN2016/108426
§ 371 (c)(1),
(2) Date: Jun. 10, 2018

(87) PCT Pub. No.: WO2017/097166
PCT Pub. Date: Jun. 15, 2017

(65) Prior Publication Data
US 2018/0365211 A1    Dec. 20, 2018

(30) Foreign Application Priority Data
Dec. 11, 2015    (CN) .......................... 2015 1 0921228

(51) Int. Cl.
*G06F 40/295*    (2020.01)
*G06F 40/242*    (2020.01)

(52) U.S. Cl.
CPC .......... *G06F 40/295* (2020.01); *G06F 40/242* (2020.01)

(58) Field of Classification Search
CPC .... G06F 17/278; G06F 40/284; G06F 40/289; G06F 40/279; G06F 40/295
See application file for complete search history.

(56) References Cited

U.S. PATENT DOCUMENTS 6,311,152 B1 * 10/2001 Bai ....................... G06F 17/277
704/251
8,539,349 B1 * 9/2013 Kirshenbaum ..... G06F 17/2863
704/10

(Continued)

OTHER PUBLICATIONS

Chen, Wenliang, Yujie Zhang, and Hitoshi Isahara. "Chinese named entity recognition with conditional random fields." In Proceedings of the Fifth SIGHAN Workshop on Chinese Language Processing, pp. 118-121. 2006. (Year: 2006).*

*Primary Examiner* — Douglas Godbold
(74) *Attorney, Agent, or Firm* — Gang Yu

(57) ABSTRACT

The invention discloses a method and device for recognizing a domain named entity. The main technical solution is: conducting word segmentation on a text to be recognized; tagging each segmented word in the text to be recognized according to a tag set of a domain corresponding to the text to be recognized, where the tag set includes a basic tag set based on domain named entity recognition and a tag set belongs to the corresponding domain, and the basic tag set includes a location tag of related words which constitute the domain named entity; and extracting the tagged segmented words according to a domain named entity extraction rule and constituting the domain named entity.

14 Claims, 3 Drawing Sheets

(56) References Cited

U.S. PATENT DOCUMENTS

| | | | | |
|---|---|---|---|---|
| 2003/0023425 A1* | 1/2003 | Pentheroudakis | .. | G06F 17/2725 704/9 |
| 2003/0229634 A1* | 12/2003 | Li | ......... | G06F 17/274 |
| 2005/0182736 A1* | 8/2005 | Castellanos | ........... | G06F 17/271 705/80 |
| 2007/0067280 A1* | 3/2007 | Zhou | ............ | G06F 17/278 |
| 2007/0078644 A1* | 4/2007 | Huang | ............ | G06F 17/277 704/9 |
| 2007/0282592 A1* | 12/2007 | Huang | ............ | G06F 17/2775 704/9 |
| 2009/0326923 A1* | 12/2009 | Yan | ............ | G06F 17/278 704/9 |
| 2010/0306139 A1* | 12/2010 | Wu | ............ | G06F 17/278 706/12 |
| 2011/0078554 A1* | 3/2011 | Nie | ............ | G06F 17/278 715/234 |
| 2011/0119050 A1* | 5/2011 | Deschacht | ............ | G06F 17/271 704/9 |
| 2013/0332450 A1* | 12/2013 | Castelli | ............ | G06F 17/278 707/722 |
| 2014/0163951 A1* | 6/2014 | Nikoulina | ............ | G06F 17/278 704/4 |
| 2014/0195884 A1* | 7/2014 | Castelli | ............ | G06F 17/278 715/201 |
| 2015/0278298 A1* | 10/2015 | Boldyrev | ............ | G06F 17/278 707/754 |
| 2016/0085856 A1* | 3/2016 | Hall | ............ | G06F 17/243 706/46 |
| 2016/0098391 A1* | 4/2016 | Anderson | ............ | G06F 17/271 715/256 |
| 2017/0060835 A1* | 3/2017 | Radford | ............ | G06F 17/277 |

* cited by examiner

METHOD AND DEVICE FOR RECOGNIZING DOMAIN NAMED ENTITY

This application is a U.S. national phase application under 37 U.S.C. § 371 of International Application No. PCT/CN2016/108426 filed on Dec. 2, 2016, which claims priority to CN Application No. 201510921228.9 filed on Dec. 11, 2015. The entire contents of each of PCT/CN2016/108426 and CN Application No. 201510921228.9 are incorporated herein by reference.

This application is based on and claims the benefit of priority to Chinese patent application No. 201510921228.9, filed on Dec. 11, 2015, the entire contents of which are hereby incorporated by reference.

TECHNICAL FIELD

The invention relates to the technical field of natural language processing, in particular to a method and device for recognizing a domain named entity.

BACKGROUND ART

Named Entity Recognition (NER), also known as "proper name recognition", refers to the recognition of an entity with a specific meaning in a text. The entity mainly includes a person name, a place name, an organization name and a proper name. Named entity recognition is an important basic tool in such fields as information extraction, question answering system, syntactic analysis, machine translation and Semantic Web-oriented metadata annotation, and plays an important role in the process of natural language processing technology becoming practical.

At present, named entity recognition is generally implemented by the following method. Specifically, the method includes the steps of constructing a named entity set or specifying an entity extraction rule; conducting word segmentation on sentences and constructing a dictionary tree or a rule tree; traversing the result of word segmentation, matching with a dictionary or a rule, if there is content matched with the dictionary or the rule, marking the position of the content, and if there is no matching content, traversing the next sentence of a text; and outputting a final annotation result till all the sentences of the text are traversed.

When implementing the named entity recognition method, the inventor finds that the current technical solution has at least the following problems: during the task of recognizing a proprietary named entity in the Chinese domain, Chinese words cannot be segmented by blank space like English words and the like, and incorrect word segmentation may lead to inaccurate determination of the boundary of the named entity, further resulting in inaccurate recognition of the named entity; moreover, the accuracy of current named entity recognition completely depends on the completeness of the dictionary or the rule, and the entity recognition task cannot be well fulfilled for a changing entity coverage.

SUMMARY OF THE INVENTION

In view of this, the invention provides a method and device for recognizing a domain named entity. The main purpose of the invention is to accurately locate the boundary of the named entity by using the method of tagging, which effectively reduces the influence of a word segmentation result on the recognition of the domain named entity, and improves the accuracy of named entity recognition.

To realize the purpose, the invention provides the following technical solutions:

In one aspect, the invention provides a method for recognizing a domain named entity, including:
conducting word segmentation on a text to be recognized;
tagging each segmented word in the text to be recognized according to a tag set of a domain corresponding to the text to be recognized, where the tag set includes a basic tag set based on domain named entity recognition and a tag set belongs to the corresponding domain, and the basic tag set includes a location tag of related words which constitute the domain named entity;
extracting the tagged segmented words according to a domain named entity extraction rule;
and constituting the domain named entity by the extracted segmented words.

In another aspect, the invention further provides a device for recognizing a domain named entity, including:
a word segmenting unit, used for conducting word segmentation on a text to be recognized;
a tagging unit, used for tagging each segmented word in the text to be recognized according to a tag set of a domain corresponding to the text to be recognized, where the tag set includes a basic tag set based on domain named entity recognition and a tag set to which the corresponding domain belongs, and the basic tag set includes a location tag constituting related words of the domain named entity;
an extracting unit, used for extracting the tagged segmented words according to a domain named entity extraction rule;
and a word combining unit, used for constituting the domain named entity by the extracted segmented words.

According to the method and device for recognizing the domain named entity of the invention, when the domain named entity in the text needs to be recognized, firstly, each segmented word in the text to be recognized is tagged according to the preset tag set of the domain corresponding to the text, that is, each segmented word in the text to be recognized is tagged according to the location tag constituting the related words of the domain named entity, then the tagged segmented words are extracted according to the domain named entity extraction rule, and the extracted segmented words are used for constituting the domain named entity; and compared with the prior art of depending on a dictionary or a rule to recognize the domain named entity, the recognition of the boundary of the domain named entity is no longer limited to the match between the segmented words and the dictionary, instead, the boundary of the domain named entity is determined and recognized through tagging; in this way, the boundary of the named entity can be accurately located, the influence of a word segmentation result on the recognition effect of the domain named entity is effectively reduced, and the accuracy of named entity recognition is improved.

The above description is merely an overview of the technical solutions of the invention. In order to better understand the technical means of the invention so as to implement the technical means according to the contents of the specification, and in order to make the above and other objectives, features and advantages of the invention more obvious and understandable, the specific embodiments of the invention are described below.

BRIEF DESCRIPTION OF THE DRAWINGS

Various other advantages and benefits will become apparent to those of ordinary skilled in the art upon reading the following detailed description of the preferred embodiments. The drawings are only for the purpose of illustrating the preferred embodiments and are not to be construed as limiting the invention. Also throughout the drawings, the same reference numerals are used to refer to the same parts. In the drawings.

DETAILED DESCRIPTION OF THE INVENTION

Hereinafter, exemplary embodiments of the disclosure will be described in more detail with reference to the accompanying drawings. Although the accompanying drawings show exemplary embodiments of the disclosure, it should be understood that the disclosure may be implemented in various forms and should not be limited to the embodiments set forth herein. Rather, these embodiments are provided in order to provide a more thorough understanding of the disclosure, and fully convey the scope of the disclosure to those skilled in the art.

Figure 1:
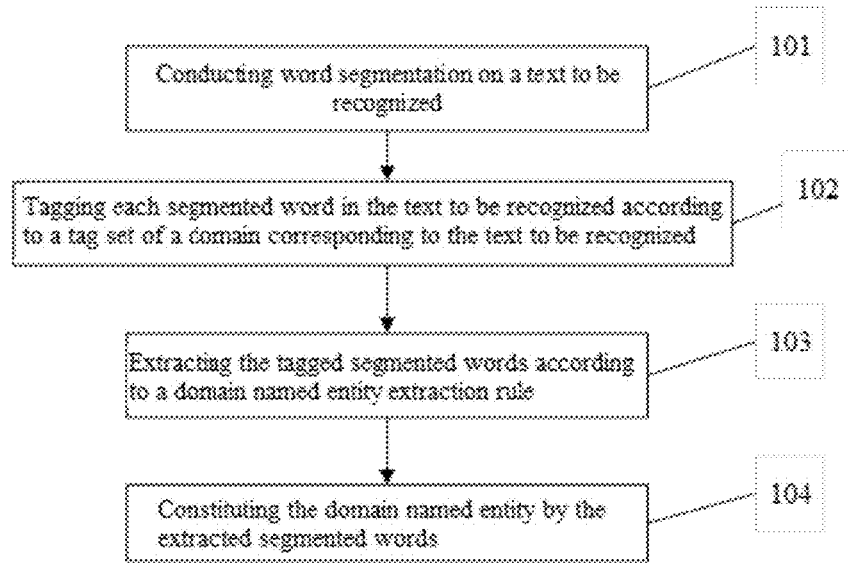
FIG. 1 shows a flow chart of a method for recognizing a domain named entity in an embodiment of the invention.

An embodiment of the invention provides a method for recognizing a domain named entity. As shown in FIG. 1, the method includes:

101. Conducting word segmentation on a text to be recognized.

Word segmentation of the text to be recognized can be implemented in any of current manners, which is not limited in the embodiments of the invention.

It's to be noted that a segmented word is not equivalent to a single word. A segmented word may include at least one word.

102. Tagging each segmented word in the text to be recognized according to a tag set of a domain corresponding to the text to be recognized, where the tag set includes a basic tag set based on domain named entity recognition and a tag set belongs to the corresponding domain, and the basic tag set includes a location tag of related words which constitute the domain named entity.

It should be noted that named entities in different domains have different internal features and it is impossible to describe all the internal features of the named entities by using a unified model. Therefore, in the embodiments of the invention, when recognizing the named entities in different domains, the tag set used in different domains varies. As described above, the tag set of each domain includes the basic tag set based on domain named entity recognition and the tag set belongs to the corresponding domain, where each tag set belongs to a domain is a tag set dedicated for the domain. For example, a group tag set can be added to the car domain; and a surname tag set can be added to person name recognition.

The basic tag set includes the location tag of related words which constitute the domain named entity, and the location tag may be, but not limited to: TS indicating that a word is located at the start of the entity, TM indicating that a word is located in the middle of the entity, TE indicating that a word is located at the end of the entity, TSN/TEN indicating that a word is located in front of or/behind the entity, TN indicating irrelevancy with the domain entity, TT indicating that two entities are in coordinating relation, TSX/TEX/TXS/TXE indicating word segmentation errors and so on. For the specific meaning of each tag, reference may be made to the description in Table 1 below.

TABLE 1

| Tag name | Meaning illustration |
|---|---|
| TS | A word is located at the start of the entity to start the entity |
| TM | A word is located in the middle of the entity, usually between TS and TE |
| TE | A word is located at the end of the entity |
| TSN/TEN | A word is located in front of or/behind the entity to annotate the context in which the entity appears |
| TSX/TEX | Word segmentation error, indicating that the word contains a part of the entity, and the word together with front/back word thereof constitute an entity |
| TXS/TXE | Word segmentation error, indicating that the word contains an entity inside |
| TN | A word irrelevant with the domain entity |
| TT | A word indicating that two entities are in coordinating relation, such as "and" |

Further, before implementing the embodiments of the invention, it is also required to first acquire the tag set of each domain, and the tag set of each domain can be acquired by, but not limited to, the following method, including: acquiring the basic tag set of domain named entity recognition and the tag set belongs to the corresponding domain; and taking a combination of the tag set belongs to the corresponding domain and the basic tag set of domain named entity recognition as the tag set of the domain.

Further, in the embodiments of the invention, tagging may be conducted on each segmented word in the text to be recognized according to the tag set of the domain corresponding to the text to be recognized by using, but not limited to, a training model. The training model may be, but not limited to, a hidden Markov model which tags the text to be recognized, and the text to be recognized can also be tagged by using a conditional random field model or a neural network model and the like. Because the hidden Markov model fully considers the context of words, the problem that existing entity recognition methods are limited by the dictionary scale is effectively solved, and therefore the embodiment of the invention preferably uses the hidden Markov model to tag the text to be recognized. For example, after sending the segmented words of a text "Shanghai Volkswagen Automobile Recall Case" to the tagging training model, "Shanghai/TS Volkswagen/TE Automobile/TEN Recall Case/TN" will be output after tagging of the tagging training model.

Figure 2:
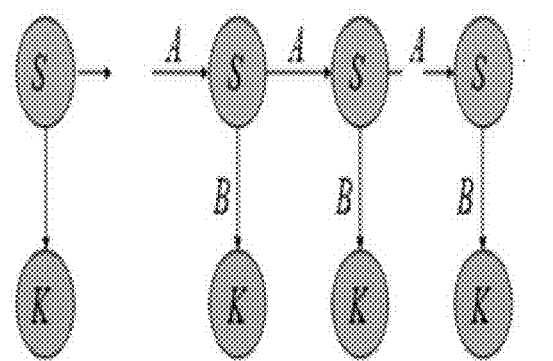
FIG. 2 shows a schematic of a hidden Markov model in an embodiment of the invention.

In the embodiments of the invention, the hidden Markov model will be briefly described with reference to FIG. 2. In the above example, the four words of "Shanghai Volkswagen Automobile Recall Case" correspond to K nodes, which indicate the words in the sentence to be tagged, are located in observation layer of the model. And corresponding tag layer including S nodes, each node can conduct tagging in the step, and the tag layer is the hidden layer of the model. A is a state transition matrix, which records the occurring probability of a latter state under the condition that a previous state occurs, and B is an observation state transition probability matrix, indicating the probability between a state (tag) in the hidden layer and an observed value (word) of the observation layer.

103. Extracting the tagged segmented words according to a domain named entity extraction rule.

In the embodiments of the invention, based on the tag set of specific domains, domain named entity extraction rules vary from task to task, and the specific rules may be set according to the needs of the entities. For example, for the car domain, the domain named entity extraction rule is: "*/TS+*/TE". During this step, it is found that the tagging result in step 102 is the sentence "Shanghai/TS Volkswagen/TE Automobile/TEN Recall Case/TN." In this step, it is found that "Shanghai/TS Volkswagen/TE" meets the rule "*/TS+*/TE", then we extract the two words "Shanghai Volkswagen".

104. Constituting the domain named entity by the extracted segmented words.

The extracted two words "Shanghai Volkswagen" are combined into the domain named entity "Shanghai Volkswagen".

After constituting the domain named entity by the extracted segmented words, if output is needed, the constituted domain named entity may be tagged with "entity", and finally such result as "Shanghai Volkswagen/entity Automobile Recall Case" is output.

In the embodiments of the invention, when the domain named entity in the text needs to be recognized, firstly, each word in the text to be recognized is tagged according to the preset tag set of the domain corresponding to the text, that is, each segmented word in the text to be recognized is tagged according to the location tag of related words which constitute the domain named entity, then the tagged segmented words are extracted according to the domain named entity extraction rule, and the extracted segmented words are used for constituting the domain named entity; and compared with the prior art of depending on a dictionary or a rule to recognize the domain named entity, the recognition of the boundary of the domain named entity is no longer limited to the match between the segmented words and the dictionary, instead, the boundary of the domain named entity is determined and recognized through tagging, in this way, the boundary of the named entity can be accurately located, the influence of a word segmentation result on the recognition effect of the domain named entity is effectively reduced, and the accuracy of named entity recognition is improved.

Further, in order to ensure the accuracy of word segmentation, the embodiments of the invention further provide a corresponding word segmentation error correction mechanism which corrects incorrect word segmentation when a word segmentation error is found. Specifically, this can be implemented by using, but not limited to, the following method, including:

1. Detecting whether there is a word segmentation error tag in the tagged text.

Specifically, for the embodiments of the invention, whether a segmented word tagged with TSX/TEX/TXS/TXE exists in the tagged text can be detected, and if yes, it is determined that the word segmentation error tag exists and step 2 is executed.

2. If the word segmentation error tag exists, conducting word segmentation error correction on a sentence in which the word segmentation error tag is located to obtain new segmented words.

The process of conducting word segmentation error correction on a sentence in which the word segmentation error tag is located to obtain the new segmented words may be implemented by using, but not limited to, an enumeration method, specifically including:

segmenting the sentence in which the word segmentation error tag is located by characters; and re-combining the characters obtained after segmentation to obtain the new segmented words.

Of course, the process of conducting word segmentation error correction on a sentence in which the word segmentation error tag is located is not limited to the above method, and other word segmentation error correction methods such as direct error correction and dictionary error correction may also be used. For direct error correction and dictionary error correction, reference may be made to the related description in the prior art, which is not described herein in the embodiments of the invention.

3. Tagging each of the new segmented words according to the tag set, and executing step 1 till there is no word segmentation error tag in the tagged text.

In order to express the word segmentation error correction in the embodiments of the invention more clearly, specific description is made by using the enumeration method. For example, if the word ABCD/TSX is detected, the word is first segmented into the characters A, B, C and D, and words which are formed by the four characters A, B, C and D are enumerated below:

1. A, B, C, D
2. AB, C, D
3. A, BC, D
4. A, B, CD
5. AB, CD
6. ABC, D
7. A, BCD

Then the word ABCD in the original segmented word is replaced with these segmented words, and the sentence with the replaced segmented words is re-tagged. If there is no such tags as TSX, TEX, TXE and TXS in current tags, a tagging result of the sentence is output and the program of word re-segmentation of the sentence is ended.

The above word segmentation error correction method can be specifically described by the following example. For example, in person name recognition, the result of a word segmentation program of the sentence "邓颖超生前和刘晓辉同学合影" is "邓颖超生前 和 刘晓辉 同学 合影", the result after processing of the tagging model is "邓颖/TSE 超生/TSX 前/TN 和/TT 刘晓辉/TSE 同学/TEN 合影/TN", where "超生/TSX" indicates that word segmentation is incorrect, and word re-segmentation is required, a word segmentation result is "邓颖 超 生 前 和 刘晓辉 同学 合影", then the sentence is re-tagged as "邓颖/TS 超/TE 生/TEN 前/TN 和/TT 刘晓辉/TSE 同学/TEN 合影/TN", and when there is no more error correction tag, the word segmentation error correction step is terminated.

The above word segmentation error correction method can also be specifically described by the following example. For example, in person name recognition, the result of a word segmentation program of the sentence "Deng Yingchao before her death and Liu Xiaohui took a picture together" is "Deng Ying chao before her death and Liu Xiaohui took a picture together", the result after processing of the tagging model is "Deng Ying/TSE chao before/TSX her death/TN and/TT Liu Xiaohui/TSE took a picture together/TN", where "chao before/TSX" indicates that word segmentation is incorrect, and word re-segmentation is required, a word segmentation result is "Deng Ying chao before her death and Liu Xiaohui took a picture together", then the sentence is re-tagged as "Deng Ying/TS chao/TE before/TEN her death/TN and/TT Liu Xiaohui/TSE took a picture together/TN", and when there is no more error correction tag, the word segmentation error correction step is terminated.

In the embodiments of the invention, after tagging the segmented word, whether a specific tag with a word segmentation error exists or not is detected. If a specific tag with a word segmentation error is detected, and error correction is conducted in the step, word re-segmentation is conducted on a sentence to be recognized corresponding to the tag, and a text obtained after word re-segmentation is re-input into the tagging model as an input text till no error correction tag appears in the tags. The technical solution of word segmentation error correction effectively avoids the influence of the word segmentation errors on the recognition result of the domain named entity and further ensures the accuracy of the domain named entity.

Figure 3:
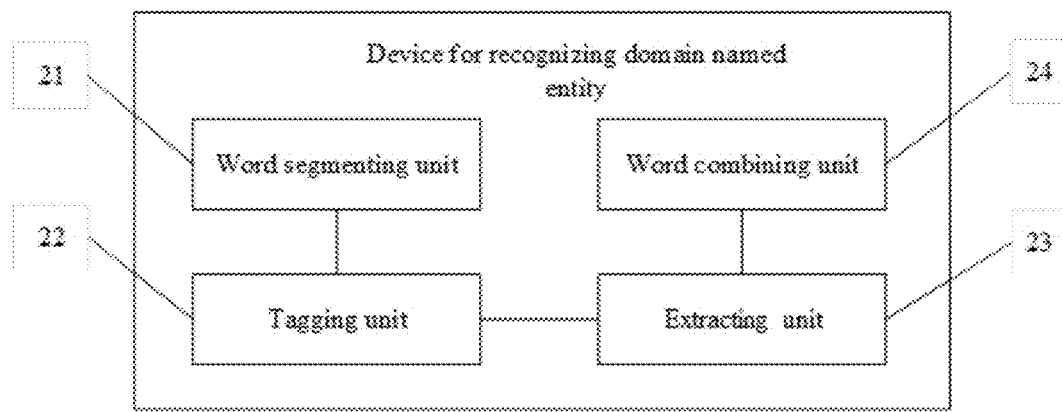
FIG. 3 shows a constitutional block diagram of a device for recognizing a domain named entity in an embodiment of the invention.

Based on the foregoing method embodiment, the embodiments of the invention further provide a device for recognizing a domain named entity. As shown in FIG. 3, the device includes:

a word segmenting unit 21, used for conducting word segmentation on a text to be recognized;

a tagging unit 22, used for tagging each segmented word in the text to be recognized according to a tag set of a domain corresponding to the text to be recognized, where the tag set includes a basic tag set based on domain named entity recognition and a tag set to which the corresponding domain belongs, and the basic tag set includes a location tag constituting related words of the domain named entity;

it should be noted that named entities in different domains have different internal features and it is impossible to describe all the internal features of the named entities by using a unified model; therefore, in the embodiments of the invention, when recognizing the named entities in different domains, the tag set used in different domains varies; as described above, the tag set of each domain includes the basic tag set based on domain named entity recognition and the tag set to which the corresponding domain belongs, where the tag set to which the corresponding domain belongs is a tag set dedicated for the domain; for example, a group tag set can be added to the car domain; and a surname tag set can be added to person name recognition;

the basic tag set includes the location tag constituting the related words of the domain named entity, and the location tag may be, but not limited to, TS indicating that a word is located at the start of the entity, TM indicating that a word is located in the middle of the entity, TE indicating that a word is located at the end of the entity, TSN/TEN indicating that a word is located in front of or/behind the entity, TN indicating irrelevancy with the domain entity, TT indicating that two entities are in coordinating relation, TSX/TEX/TXS/TXE indicating word segmentation errors and so on;

an extracting unit 23, used for extracting the tagged segmented words according to a domain named entity extraction rule; in the embodiments of the invention, based on the tag set of specific domains, domain named entity extraction rules vary from task to task, and the specific rules may be set according to the needs of the entities; for example, for the car domain, the domain named entity extraction rule is: "*/TS+*/TE";

and a word combining unit 24, used for constituting the domain named entity by the extracted segmented words.

Figure 4:
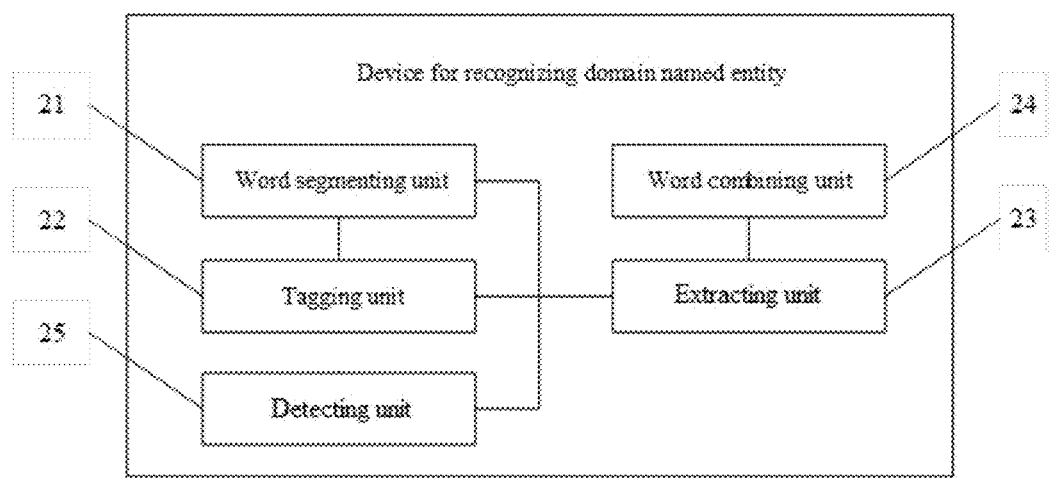
FIG. 4 shows a constitutional block diagram of another device for recognizing a domain named entity in an embodiment of the invention.

Further, as shown in FIG. 4, the device further includes:

a detecting unit 25, used for detecting whether there is any word segmentation error tag in the tagged text after the tagging unit 22 tags each segmented word in the text to be recognized according to the tag set of the domain corresponding to the text to be recognized.

The word segmenting unit 21 is further used for conducting word segmentation error correction on a sentence in which the word segmentation error tag is located to obtain new segmented words when the detecting unit 25 detects the word segmentation error tag. Specifically, the process of conducting word segmentation error correction on a sentence in which the word segmentation error tag is located to obtain the new segmented words by the word segmenting unit 21 includes the steps of segmenting the sentence in which the word segmentation error tag is located by characters and re-combining to obtain the new segmented words. The related description of segmenting the sentence in which the word segmentation error tag is located by characters and re-combining to obtain the new segmented words by the word segmenting unit is not repeated herein in the embodiments of the invention, and the method embodiment may be referred for related description.

The tagging unit 22 is further used for tagging each of the new segmented words according to the tag set till there is no word segmentation error tag in the tagged text.

Figure 5:
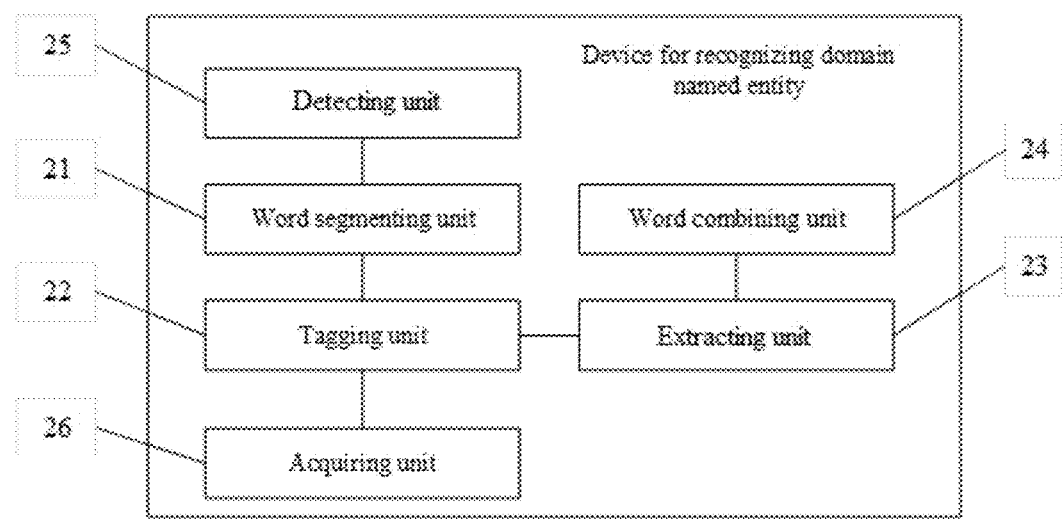
FIG. 5 shows a constitutional block diagram of yet another device for recognizing a domain named entity in an embodiment of the invention.

Further, as shown in FIG. 5, the device further includes:

an acquiring unit 26, used for acquiring the basic tag set based on domain named entity recognition and the tag set to which the corresponding domain belongs before the tagging unit 22 tags each segmented word in the text to be recognized according to the tag set of the domain corresponding to the text to be recognized.

The acquiring unit 26 is also used for taking a combination of the tag set to which the corresponding domain belongs and the basic tag set based on domain named entity recognition as the tag set of the domain.

It should be noted that for other descriptions of the functional units and the functional modules involved in the embodiments of the invention, reference may be made to the corresponding descriptions in the method embodiment, and details are not described herein again in the embodiments of the invention.

According to the method and device for recognizing the domain named entity of the invention, when the domain named entity in the text needs to be recognized, firstly, each segmented word in the text to be recognized is tagged according to the preset tag set of the domain corresponding to the text, that is, each segmented word in the text to be recognized is tagged according to the location tag constituting the related words of the domain named entity, then the tagged segmented words are extracted according to the domain named entity extraction rule, and the extracted segmented words are used for constituting the domain named entity; and compared with the prior art of depending on a dictionary or a rule to recognize the domain named entity, the recognition of the boundary of the domain named entity is no longer limited to the match between the segmented words and the dictionary, instead, the boundary of the domain named entity is determined and recognized through tagging, in this way, the boundary of the named entity can be accurately located, the influence of a word segmentation result on the recognition effect of the domain named entity is effectively reduced, and the accuracy of named entity recognition is improved.

Furthermore, after tagging the segmented word, whether a specific tag with a word segmentation error exists or not is detected. If a specific tag with a word segmentation error is detected, and error correction is conducted in the step, word re-segmentation is conducted on the sentence to be recognized corresponding to the tag, and the text obtained after word re-segmentation is re-input into the tagging model as an input text till no error correction tag appears in the tags. The step effectively avoids the influence of the word segmentation errors on the recognition result of the domain named entity and further ensures the accuracy of the domain named entity.

The device for recognizing the domain named entity includes a processor and a memory, the word segmenting unit, the tagging unit, the extracting unit, the word combining unit, the detecting unit, the acquiring unit and the like are all stored in the memory as program units, and the program units stored in the memory are executed by the processor so as to realize corresponding functions.

The processor includes cores inside, and the cores retrieve the corresponding program units in the memory. The number of the cores may be one or more, based on the adjustment of core parameters, the boundary of the named entity is accurately located by using the method of tagging, which effectively reduces the influence of a word segmentation result on the recognition of the domain named entity, and improves the accuracy of named entity recognition.

The memory may be in the form of a volatile memory, a random access memory (RAM) and/or a non-volatile memory in a computer readable medium, such as a read only memory (ROM) or a flash RAM, and the memory includes at least one memory chip.

The application also provides a computer program product which, when executed on a data processing apparatus, is adapted to execute a program code for initializing a method including the following steps: conducting word segmentation on a text to be recognized; tagging each segmented word in the text to be recognized according to a tag set of a domain corresponding to the text to be recognized, where the tag set includes a basic tag set based on domain named entity recognition and a tag set to which the corresponding domain belongs, and the basic tag set includes a location tag constituting related words of the domain named entity; extracting the tagged segmented words according to a domain named entity extraction rule; and constituting the domain named entity by the extracted segmented words.

Those skilled in the art should understand that the embodiments of the application may be provided as a method, a system, or a computer program product. Accordingly, the application may take the form of a full hardware embodiment, a full software embodiment, or an embodiment combining software and hardware. Moreover, the application may take the form of a computer program product implemented on one or more computer usable storage media (including, but not limited to, magnetic disk storage, CD-ROM and optical storage), containing computer usable program codes.

The application is described with reference to the flow charts and/or block diagrams of a method, an apparatus (system) and a computer program product according to the embodiments of the application. It should be understood that each flow and/or block in the flow charts and/or the block diagrams, and combinations of the flows and/or blocks in the flow charts and/or the block diagrams, may be implemented by computer program instructions. These computer program instructions may be provided to a processor of a general purpose computer, a special purpose computer, an embedded processing machine or other programmable data processing apparatus, to produce a machine such that the instructions executed by the processor of the computer or other programmable data processing apparatus produces a device which can realize the functions specified in one or more flows in the flow charts and/or one or more blocks in the block diagrams.

These computer program instructions may also be stored in a computer readable memory which can direct a computer or other programmable data processing apparatus to function in a particular manner such that the instructions stored in the computer readable memory produce articles of manufacture including an instruction device, and the instruction device realizes the functions specified in one or more flows in the flow charts and/or one or more blocks in the block diagrams.

These computer program instructions may also be loaded onto a computer or other programmable data processing apparatus to cause a series of operating steps to be performed on the computer or other programmable apparatus to produce computer-implemented processes, so that the instructions executed on the computer or other programmable apparatus provide steps for realizing the functions specified in one or more flows in the flow charts and/or one or more blocks in the block diagrams.

In a typical configuration, a computing device includes one or more processors (CPUs), an input/output interface, a network interface and a memory.

The memory may be a volatile memory, a random access memory (RAM) and/or a non-volatile memory in a computer readable medium, such as a read only memory (ROM) or a flash RAM. The memory is an example of the computer-readable medium.

The computer readable medium may be permanent and non-permanent, removable and non-removable medium, and may achieve information storage by any method or technology. Information can be computer readable instructions, data structures, modules of programs, or other data. Examples of the computer storage medium include, but are not limited to, phase change memory (PRAM), static random access memory (SRAM), dynamic random access memory (DRAM), other types of random access memory (RAM), read only memory (ROM), electrically erasable programmable read only memory (EEPROM), flash memory or other memory technologies, compact disk read only memory (CD-ROM), digital versatile disc (DVD), or other optical storages, magnetic tape cassette, disk and tape storage or other magnetic storage devices or any other non-transmission media, and can be used to store information to which the computing device can have access. As defined herein, the computer readable medium does not include transitory media such as modulated data signals and carriers.

The foregoing is only the embodiments of the application and is not intended to limit the application. For those skilled in the art, various changes and variations may be made in the application. Any modification, equivalent replacement, improvement and the like made within the spirit and principle of the application should be included in the scope of the claims of the application.

The invention claimed is:

1. A method for recognizing a domain named entity, characterized by comprising:
conducting word segmentation on a text to be recognized;
tagging each segmented word in the text to be recognized according to a tag set of a domain corresponding to the text to be recognized, wherein the tag set comprises a basic tag set based on domain named entity recognition and a tag set belongs to the corresponding domain, and the basic tag set comprises a location tag of related words which constitute the domain named entity;
extracting the tagged segmented words according to a domain named entity extraction rule;

and constituting the domain named entity by the extracted segmented words, the location tag comprises incorrect word segmentation; and after tagging each segmented word in the text to be recognized according to the tag set of the domain corresponding to the text to be recognized, the method further comprises:

detecting whether there is a word segmentation error tag in the tagged text;

if the word segmentation error tag exists, conducting word segmentation error correction on a sentence in which the word segmentation error tag is located to obtain new segmented words;

and tagging each of the new segmented words according to the tag set till there is no word segmentation error tag in the tagged text.

2. The method according to claim 1, characterized in that the process of conducting word segmentation error correction on a sentence in which the word segmentation error tag is located to obtain the new segmented words comprises:

segmenting the sentence in which the word segmentation error tag is located by characters and re-combining to obtain the new segmented words.

3. The method according to claim 2, characterized in that before tagging each segmented word in the text to be recognized according to the tag set of the domain corresponding to the text to be recognized, the method further comprises:

acquiring the basic tag set of domain named entity recognition and the tag set belongs to the corresponding domain;

and taking a combination of the tag set belongs to the corresponding domain and the basic tag set of domain named entity recognition as the tag set of the domain.

4. The method according to claim 2, characterized in that the location tag further comprises:

a word being located at the start of the entity, a word being located in the middle of the entity, a word being located at the end of the entity, a word being located in front of or/behind the entity, a word being irrelevancy with the domain entity, and a word indicating that two entities are in coordinating relation.

5. The method according to claim 1, characterized in that before tagging each segmented word in the text to be recognized according to the tag set of the domain corresponding to the text to be recognized, the method further comprises:

acquiring the basic tag set of domain named entity recognition and the tag set belongs to the corresponding domain;

and taking a combination of the tag set belongs to the corresponding domain and the basic tag set of domain named entity recognition as the tag set of the domain.

6. The method according to claim 1, characterized in that the location tag further comprises:

a word being located at the start of the entity, a word being located in the middle of the entity, a word being located at the end of the entity, a word being located in front of or/behind the entity, a word being irrelevancy with the domain entity, and a word indicating that two entities are in coordinating relation.

7. The method according to claim 1, characterized in that before tagging each segmented word in the text to be recognized according to the tag set of the domain corresponding to the text to be recognized, the method further comprises:

acquiring the basic tag set of domain named entity recognition and the tag set belongs to the corresponding domain;

and taking a combination of the tag set belongs to the corresponding domain and the basic tag set of domain named entity recognition as the tag set of the domain.

8. A device for recognizing a domain named entity, characterized by comprising:

a processor, wherein the processor is configured to execute the following program units stored in a memory;

a word segmenting unit, used for conducting word segmentation on a text to be recognized;

a tagging unit, used for tagging each segmented word in the text to be recognized according to a tag set of a domain corresponding to the text to be recognized, wherein the tag set comprises a basic tag set based on domain named entity recognition and a tag set belongs to the corresponding domain, and the basic tag set comprises a location tag of related words which constitute the domain named entity;

an extracting unit, used for extracting the tagged segmented words according to a domain named entity extraction rule;

and a word combining unit, used for constituting the domain named entity by the extracted segmented words, the location tag comprises incorrect word segmentation; and the device further comprises:

a detecting unit, used for detecting whether there is any word segmentation error tag in the tagged text after the tagging unit tags each segmented word in the text to be recognized according to the tag set of the domain corresponding to the text to be recognized;

the word segmenting unit is further used for conducting word segmentation error correction on a sentence in which the word segmentation error tag is located to obtain new segmented words when the detecting unit detects the word segmentation error tag;

the tagging unit is further used for tagging each of the new segmented words according to the tag set till there is no word segmentation error tag in the tagged text.

9. The device according to claim 8, characterized in that the process of conducting word segmentation error correction on a sentence in which the word segmentation error tag is located to obtain the new segmented words by the word segmenting unit specifically comprises:

segmenting the sentence in which the word segmentation error tag is located by characters and re-combining to obtain the new segmented words.

10. The device according to claim 9, characterized by further comprising:

an acquiring unit, used for acquiring the basic tag set of domain named entity recognition and the tag set belongs to the corresponding domain before the tagging unit tags each segmented word in the text to be recognized according to the tag set of the domain corresponding to the text to be recognized;

the acquiring unit is further used for taking a combination of the tag set belongs to the corresponding domain and the basic tag set of domain named entity recognition as the tag set of the domain.

11. The device according to claim 9, characterized in that the location tag further comprises:

a word being located at the start of the entity, a word being located in the middle of the entity, a word being located at the end of the entity, a word being located in front of or/behind the entity, a word being irrelevancy with the domain entity, and a word indicating that two entities are in coordinating relation.

12. The device according to claim 8, characterized by further comprising:
   an acquiring unit, used for acquiring the basic tag set of domain named entity recognition and the tag set belongs to the corresponding domain before the tagging unit tags each segmented word in the text to be recognized according to the tag set of the domain corresponding to the text to be recognized;
   the acquiring unit is further used for taking a combination of the tag set belongs to the corresponding domain and the basic tag set of domain named entity recognition as the tag set of the domain.

13. The device according to claim 8, characterized in that the location tag further comprises:
   a word being located at the start of the entity, a word being located in the middle of the entity, a word being located at the end of the entity, a word being located in front of or/behind the entity, a word being irrelevancy with the domain entity, and a word indicating that two entities are in coordinating relation.

14. The device according to claim 8 , characterized by further comprising:
   an acquiring unit, used for acquiring the basic tag set of domain named entity recognition and the tag set belongs to the corresponding domain before the tagging unit tags each segmented word in the text to be recognized according to the tag set of the domain corresponding to the text to be recognized;
   the acquiring unit is further used for taking a combination of the tag set belongs to the corresponding domain and the basic tag set of domain named entity recognition as the tag set of the domain.

* * * * *